(12) United States Patent
Chen

(10) Patent No.: US 6,688,203 B2
(45) Date of Patent: Feb. 10, 2004

(54) CIRCULAR SAWING MACHINE HAVING INDICATION DEVICE

(75) Inventor: Ruey Zou Chen, Taichung Hsien (TW)

(73) Assignee: Rexon Co., Ltd., Taichung Hsien (TW)

( * ) Notice: Subject to any disclaimer, the term of this patent is extended or adjusted under 35 U.S.C. 154(b) by 36 days.

(21) Appl. No.: 09/993,548

(22) Filed: Nov. 27, 2001

(65) Prior Publication Data

US 2003/0097922 A1 May 29, 2003

(51) Int. Cl.[7] .............................. B27B 11/02; B26D 7/00
(52) U.S. Cl. ...................................... 83/520; 83/522.13
(58) Field of Search ............................... 83/520, 522.13, 83/581, 471.3; 30/376

(56) References Cited

U.S. PATENT DOCUMENTS

| | | | | |
|---|---|---|---|---|
| 4,257,297 A | * | 3/1981 | Nidbella | 83/471.3 |
| 5,375,495 A | * | 12/1994 | Bosten et al. | 83/520 |
| 5,546,840 A | * | 8/1996 | Supe-Dienes | 83/478 |
| 6,397,717 B1 | * | 6/2002 | Waite | 83/520 |
| 6,481,322 B1 | * | 11/2002 | Hsiung | 83/521 |

* cited by examiner

Primary Examiner—Timothy V. Eley
Assistant Examiner—John Windmuller
(74) Attorney, Agent, or Firm—Rosenberg, Klein & Lee

(57) ABSTRACT

A circular sawing machine includes a work table, a saw seat having a first end provided with a saw blade and a second end pivotally mounted the work table, and an indication device mounted on the saw seat. The indication device includes a support seat secured on the saw seat, a slide seat mounted on the support seat, and an indication light source mounted on the slide seat.

7 Claims, 4 Drawing Sheets

CIRCULAR SAWING MACHINE HAVING INDICATION DEVICE

BACKGROUND OF THE INVENTION

1. Field of the Invention

The present invention relates to a circular sawing machine, and more particularly to a circular sawing machine having an indication device that may clearly indicate the working position of the saw blade of the circular sawing machine.

2. Description of the Related Art

A conventional circular sawing machine is a tool that may be used to cut a workpiece such as the wood or the like. The conventional circular sawing machine comprises a work table formed with an elongated slit, a saw seat pivotally mounted on the work table, and provided with a saw blade. Thus, when the saw seat is pivoted downward to approach the work table, the saw blade may pass through the elongated slit of the work table.

When in use, one hand of the operator has to hold the workpiece on the work table, and the other hand of the operator has to press the saw seat downward. When the saw blade approaches the surface of the workpiece, the operator has to visually inspect if the saw blade aligns with the position to be cut. The operator has to move the workpiece if the saw blade does not align with the position to be cut, so that the operator has to align the saw blade with the position to be cut continuously and repeatedly, thereby wasting much time. In addition, the operator's face has to approach the saw seat to obtain a more exact result, thereby easily causing danger to the operator. Further, when the saw blade approaches the surface of the workpiece, the saw blade is very easy to touch the surface of the workpiece unintentionally, thereby producing unnecessary dents on the surface of the workpiece.

SUMMARY OF THE INVENTION

The present invention has arisen to mitigate and/or obviate the disadvantage of the conventional circular sawing machine.

The primary objective of the present invention is to provide a circular sawing machine, wherein an indication device is mounted on the circular sawing machine. The indication device may be moved and rotated, and may project a light onto the surface of a workpiece, to clearly indicate the working and cutting position of the saw blade of the circular sawing machine to contrast with the position of the workpiece to be cut so that the saw blade of the circular sawing machine may be operated on the correct position, thereby increasing the precision of the cutting work and enhancing convenience of operation of the circular sawing machine.

Another objective of the present invention is to provide a circular sawing machine having an indication device, wherein the indication device may be displaced horizontally to adjust the position of the indication device, and may be rotated to adjust the angle and direction of the light projected by the indication device.

In accordance with the present invention, there is provided a circular sawing machine having an indication device, comprising:

a work table;

a saw seat having a first end provided with a saw blade and a second end pivotally mounted the work table; and an indication device mounted on the saw seat, and including a support seat secured on the saw seat a slide seat mounted on the support seat, and an indication light source mounted on the slide seat.

Further benefits and advantages of the present invention will become apparent after a careful reading of the detailed description with appropriate reference to the accompanying drawings.

DETAILED DESCRIPTION OF THE INVENTION

Figure 1:
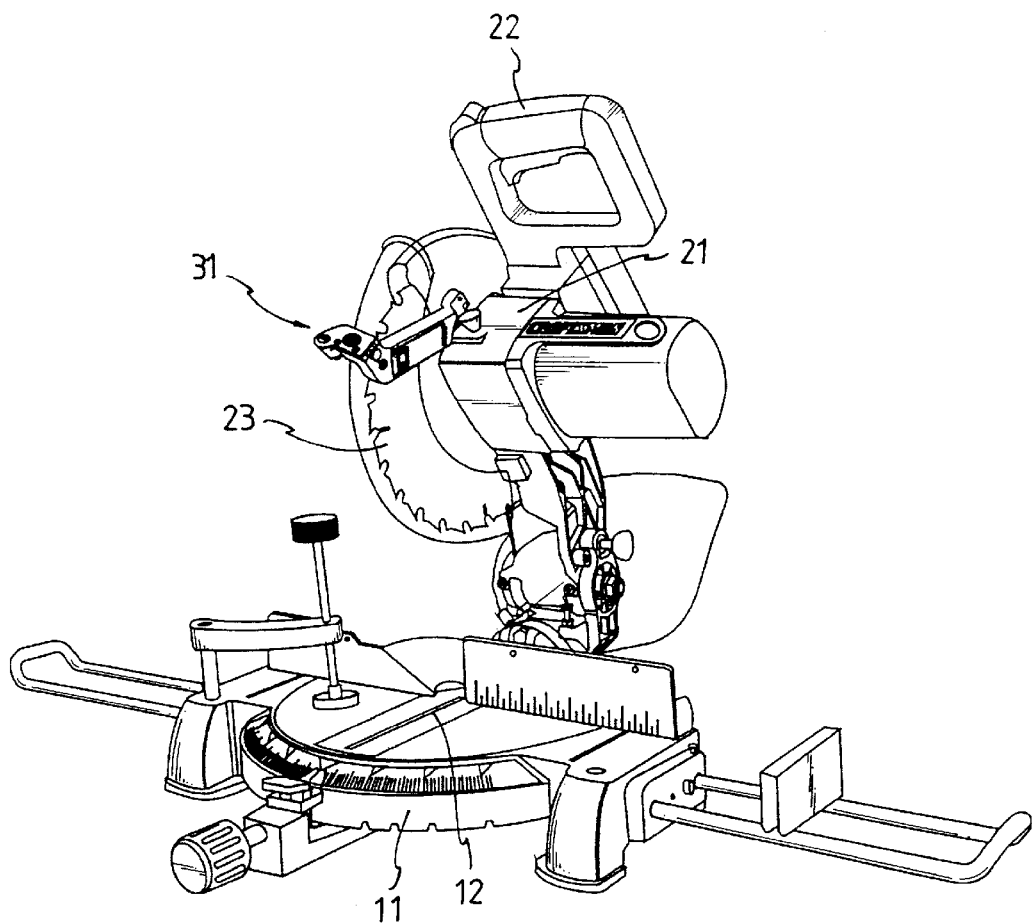
FIG. 1 is a perspective view of a circular sawing machine having an indication device in accordance with a preferred embodiment of the present invention.

Referring to the drawings and initially to FIG. 1, a circular sawing machine having an indication device in accordance with the preferred embodiment of the present invention comprises a work table 11 arranged in a horizontal manner, a saw seat 21 pivotally mounted on a side of the work table 11, and an indication device 31 secured on one end of the saw seat 21.

The work table 11 has a surface formed with an elongated slit 12.

The saw seat 21 has one end provided with a handle 22, and the one end of the saw seat 21 has a side face provided with a saw blade 23 that may be rotated to provide a cutting function. The other end of the saw seat 21 is pivotally mounted on the side of the work table 11, so that the saw seat 21 may be pivoted on the work table 11 to move along a longitudinal arc-shaped track. It is to be noted that, when the saw seat 21 is pivoted downward to approach the work table 11, the saw blade 23 may pass through the elongated slit 12 of the work table 11.

Figure 2:
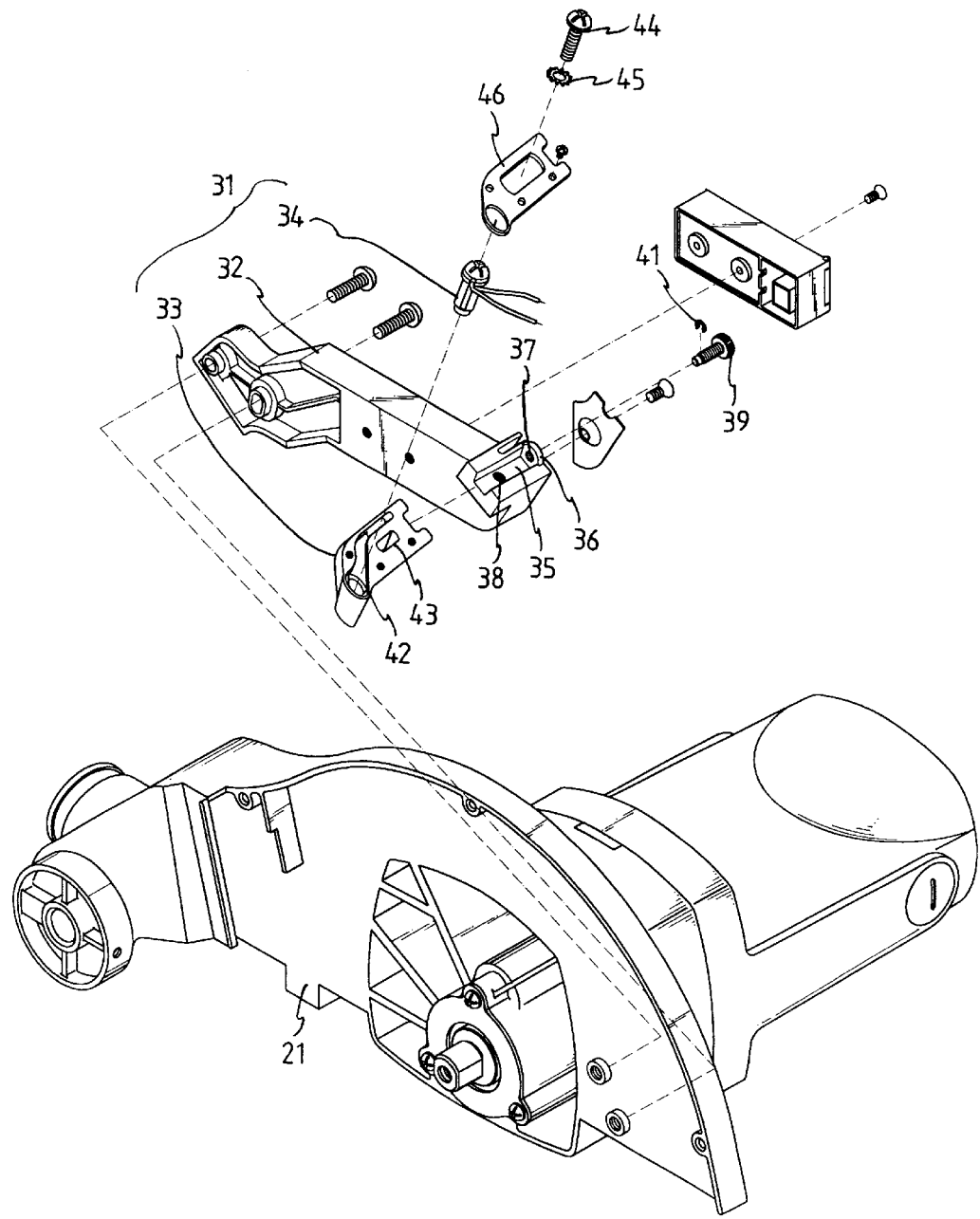
FIG. 2 is a partially exploded perspective view of the circular sawing machine having an indication device as shown in FIG. 1.
Figure 3:
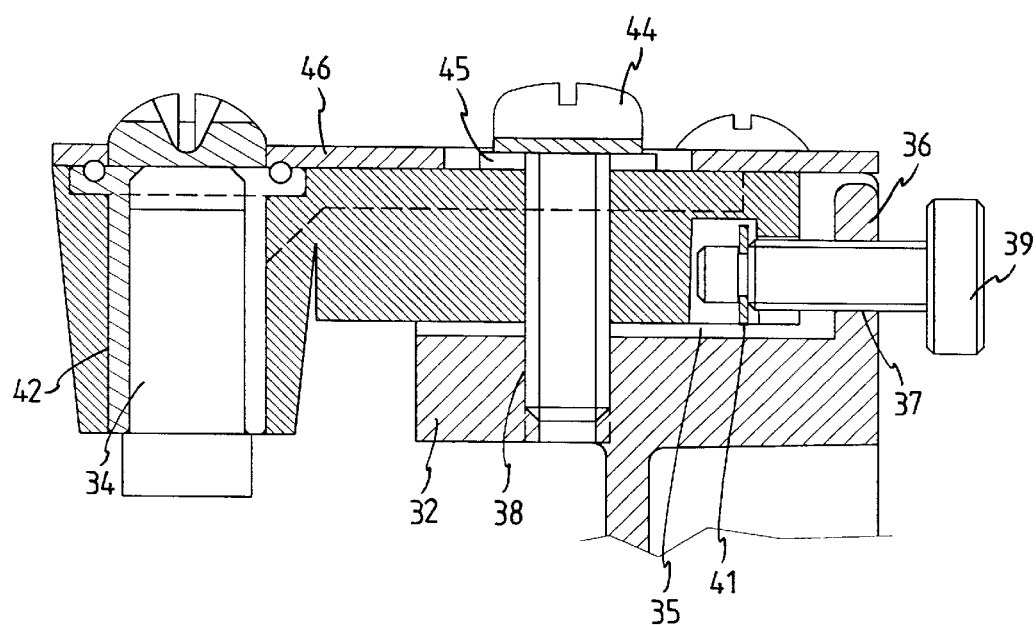
FIG. 3 is a cross-sectional assembly view of the circular sawing machine having an indication device as shown in FIG. 2.

Referring to FIGS. 2 and 3, the indication device 31 includes a support seat 32, a slide seat 33, and an indication light source 34.

One end of the support seat 32 is secured on the saw seat 21, and the other end of the support seat 32 is formed with a slide channel 35. One end of the slide channel 35 is protruded with a catch face 36. The catch face 36 is formed with a screw hole 37. The slide channel 35 has a bottom face formed with a screw hole 38.

The slide seat 33 is mounted in the slide channel 35 of the support seat 32. An adjusting bolt 39 may co-operate with a retaining member 41 (such a C-shaped snap ring) to extend through the screw hole 37 of the catch face 36 to combine with one end of the slide seat 33. The other end of the slide seat 33 is formed with a screw hole 42. The indication light source 34 is screwed in the screw hole 42 of the slide seat 33.

In addition, the slide seat 33 has a surface formed with an elongated slot 43. When the slide seat 33 is mounted in the slide channel 35 of the support seat 32, the elongated slot 43 of the slide seat 33 is opposite to the screw hole 38 formed in the bottom face of the slide channel 35. A positioning bolt 44 may co-operate with a washer 45 to extend through the elongated slot 43 of the slide seat 33 to be screwed and locked in the screw hole 38 formed in the bottom face of the slide channel 35 of the support seat 32.

It is to be noted that, when the positioning bolt 44 is urged on the slide seat 33, the slide seat 33 is securely received in the slide channel 35, thereby forming a positioning state. At the same time, the indication light source 34 is opposite to the circumference of the saw blade 23. In addition, a top cover 46 is mounted on an upper surface of the slide seat 33.

When in use, the indication light source 34 may light to project the light outward onto a workpiece (not shown) on the work table 11. Because the indication light source 34 is opposite to the circumference of the saw blade 23, the position projected by the light of the indication light source 34 is exactly the position of the workpiece to be cut by the saw blade 23. Thus, the operator may easily and clearly inspect the deflection between the cutting position of the saw blade 23 and the position of the workpiece to be cut, thereby adjusting the position of the workpiece accordingly. In addition, the saw seat 21 is not located adjacent to the workpiece, thereby preventing the saw blade 23 of the saw seat 21 from cutting the workpiece unintentionally. Further, the operator's face needs not to approach the saw seat 21, thereby preventing hurting the operator.

Usually, an outstanding vibration will produce during the cutting process, so that the slide seat 33 easily slips, thereby causing misalignment of the position indicated by the indication light source 34 and the cutting position of the saw blade 23.

Thus, referring to FIG. 3, the operator may initially unscrew the positioning bolt 44 that is locked on the slide seat 33 and the support seat 32, then rotates the adjusting bolt 39, thereby adjusting the position of the slide seat 33. Then, the positioning bolt 44 may be screwed and tightened after adjustment, thereby positioning the slide seat 33.

Figure 4:
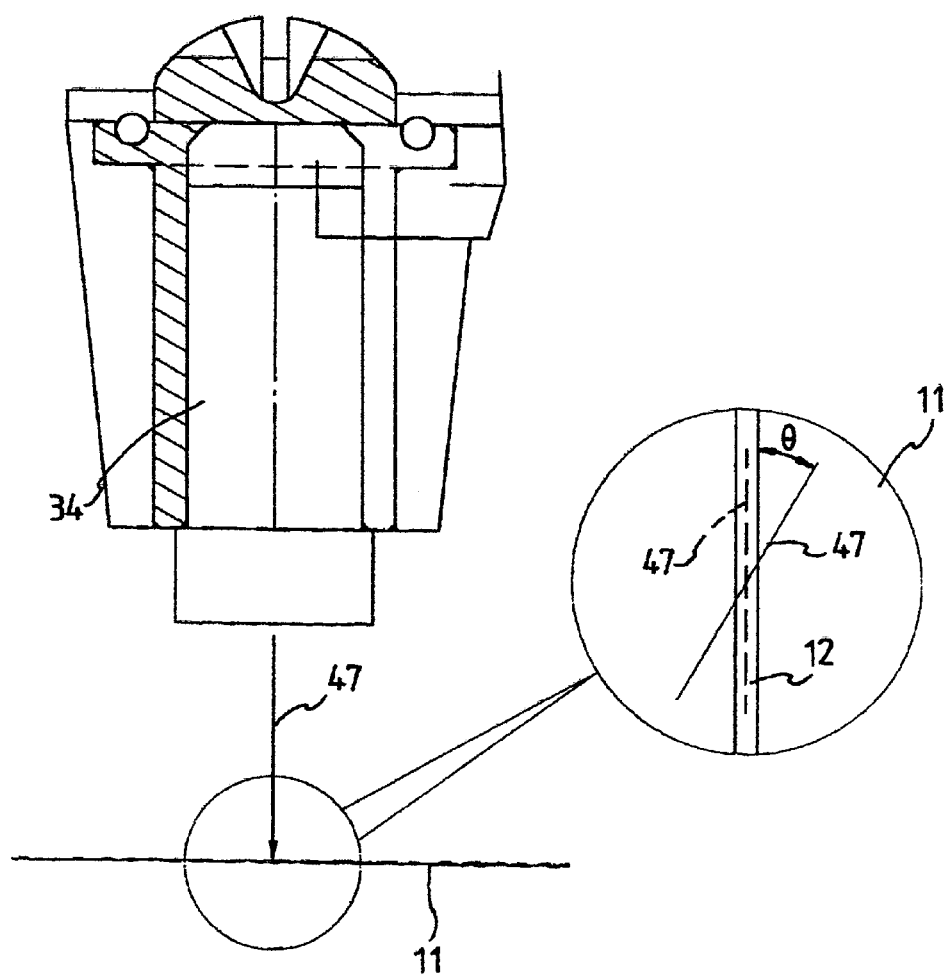
FIG. 4 is a schematic view of adjustment of the light source of the circular sawing machine having an indication device in accordance with the present invention.

Referring to FIG. 4, the indication light source 34 may project a linear indication light 47. The indication light 47 should align with (or overlap) the elongated slit 12 of the work table 11. The outstanding vibration producing during the cutting process will cause the indication light source 34 to deflect, so that an included angle "θ" will be formed between the indication light 47 projected by the indication light source 34 and the elongated slit 12 of the work table 11. At this time, the operator may rotate the indication light source 34, so that the indication light 47 may align with (or overlap) the elongated slit 12 of the work table 11 again.

Accordingly, the circular sawing machine having an indication device in accordance with the present invention may exactly indicate the cutting position that may contrast with the position of the workpiece to be cut, thereby facilitating adjusting the position of the workpiece. In addition, the circular sawing machine having an indication device in accordance with the present invention also provides an adjusting structure that may be operated easily and conveniently so as to compensate deflection of the indication light source 34 caused by the outstanding vibration producing during the cutting process, thereby enhancing operation of the circular sawing machine.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A circular sawing machine having an indication device, comprising:

a work table;

a saw seat having a first end provided with a saw blade and a second end pivotally mounted on the work table;

an indication device mounted on the saw seat, and including a support seat secured on the saw seat, a slide seat mounted on the support seat, and an indication light source mounted on the slide seat; and, an adjusting bolt rotatably mounted between the slide seat and the support seat for adjusting a position of the slide seat, the support seat being provided with a catch face formed with a screw hole, and the adjusting bolt being screwed into the screw hole of the catch face and secured on the slide seat.

2. The circular sawing machine having an indication device in accordance with claim 1, wherein the support seat has one end provided with a slide channel for mounting the slide seat.

3. The circular sawing machine having an indication device in accordance with claim 2, wherein the slide channel of the support seat is formed with a screw hole, the slide seat is formed with an elongated slot, and the circular sawing machine further comprises a positioning bolt extending through the elongated slot of the slide seat and screwed into the screw hole formed in the slide channel of the support seat.

4. The circular sawing machine having an indication device in accordance with claim 3, further comprising a washer mounted around on the positioning bolt and pressed between the slide seat and the positioning bolt.

5. The circular sawing machine having an indication device in accordance with claim 1, further comprising a retaining member mounted on the adjusting bolt and pressed between the catch face of the support seat and the adjusting bolt.

6. The circular sawing machine having an indication device in accordance with claim 1, wherein the indication light source is screwed onto one end of the slide seat.

7. The circular sawing machine having an indication device in accordance with claim 1, wherein the slide seat is formed with a screw hole, and the indication light source is screwed in the screw hole of the slide seat.

\* \* \* \* \*